(12) United States Patent
Simon

(10) Patent No.: US 8,105,192 B2
(45) Date of Patent: Jan. 31, 2012

(54) CONTINUOUSLY VARIABLE TRANSMISSION

(75) Inventor: Emmanuel Simon, Herrlisheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 199 days.

(21) Appl. No.: 12/380,011

(22) Filed: Feb. 21, 2009

(65) Prior Publication Data

US 2010/0317473 A1   Dec. 16, 2010

Related U.S. Application Data

(60) Provisional application No. 61/066,740, filed on Feb. 22, 2008.

(51) Int. Cl.
*F16H 9/00* (2006.01)

(52) U.S. Cl. .......................................... 474/74; 74/732.1

(58) Field of Classification Search .................... 474/11, 474/70, 74; 74/731.1, 732.1
See application file for complete search history.

(56) References Cited

U.S. PATENT DOCUMENTS

| | | | | | |
|---|---|---|---|---|---|
| 4,871,343 | A | * | 10/1989 | Hattori | 474/28 |
| 4,876,920 | A | * | 10/1989 | Eichenberger | 475/66 |
| 4,881,925 | A | * | 11/1989 | Hattori | 474/18 |
| 4,904,229 | A | * | 2/1990 | Hattori | 474/12 |
| 4,913,686 | A | * | 4/1990 | Hattori | 474/69 |
| 5,314,385 | A | * | 5/1994 | Haley et al. | 474/28 |
| 7,278,939 | B2 | * | 10/2007 | Sato et al. | 474/72 |
| 7,625,306 | B2 | * | 12/2009 | Sato | 474/80 |

* cited by examiner

*Primary Examiner* — Sang Kim
(74) *Attorney, Agent, or Firm* — Alfred J. Mangels

(57) ABSTRACT

A motor vehicle transmission having a continuously variable transmission ratio. The transmission includes an input-side torque converter that is optionally connectable on the output side through a first transmission stage with a predetermined gear ratio, or through a second, continuously variable transmission stage, to the output shaft of the transmission so that it transmits torque. The transmission ratio of the continuously variable transmission stage is adjustable in such a way that the rotational speed of the transmission output shaft remains constant when the transmission of torque is shifted from the first transmission stage to the second transmission stage.

10 Claims, 4 Drawing Sheets

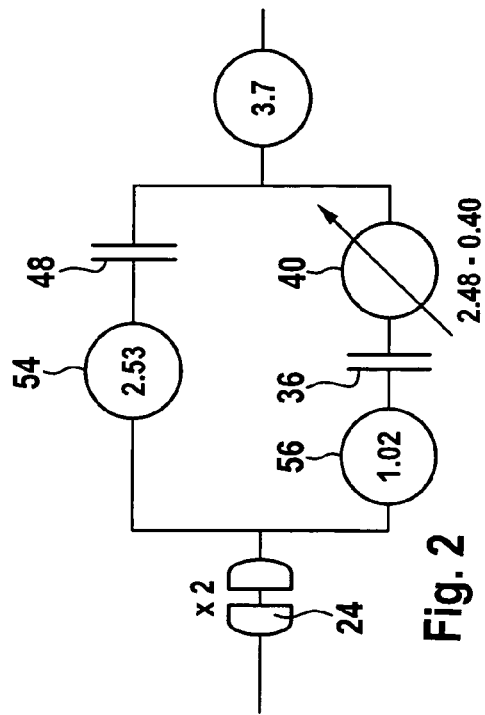
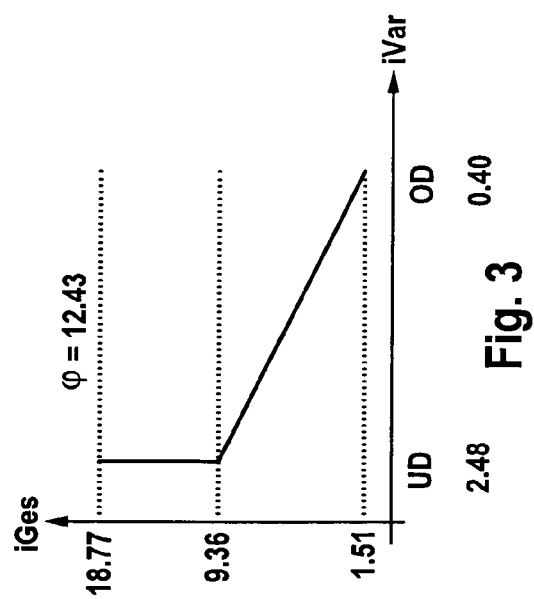
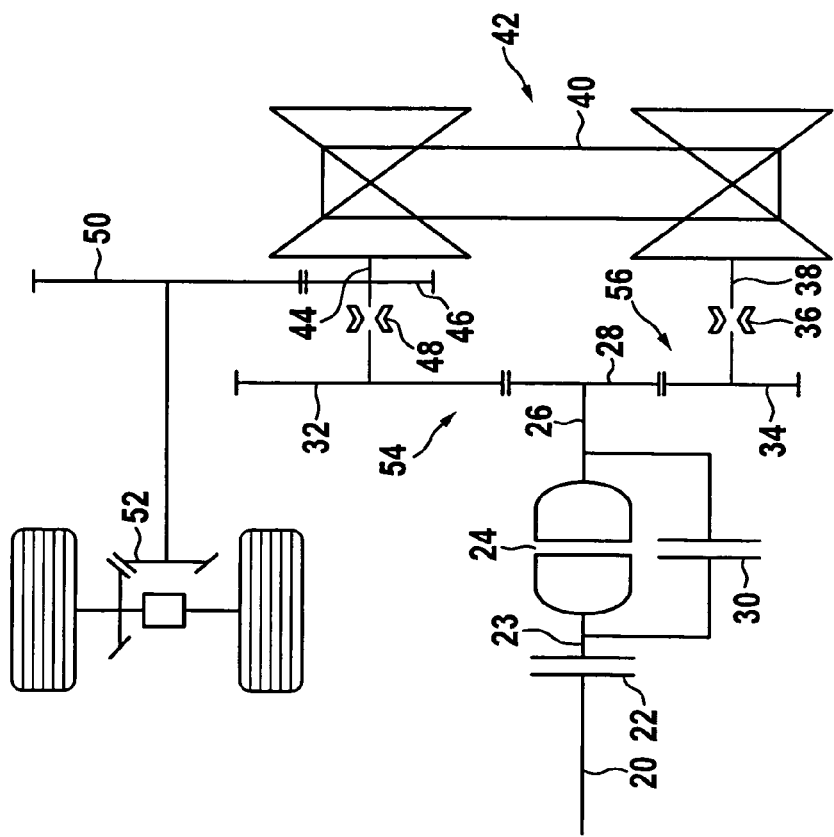
Fig. 2
Fig. 3
Fig. 1

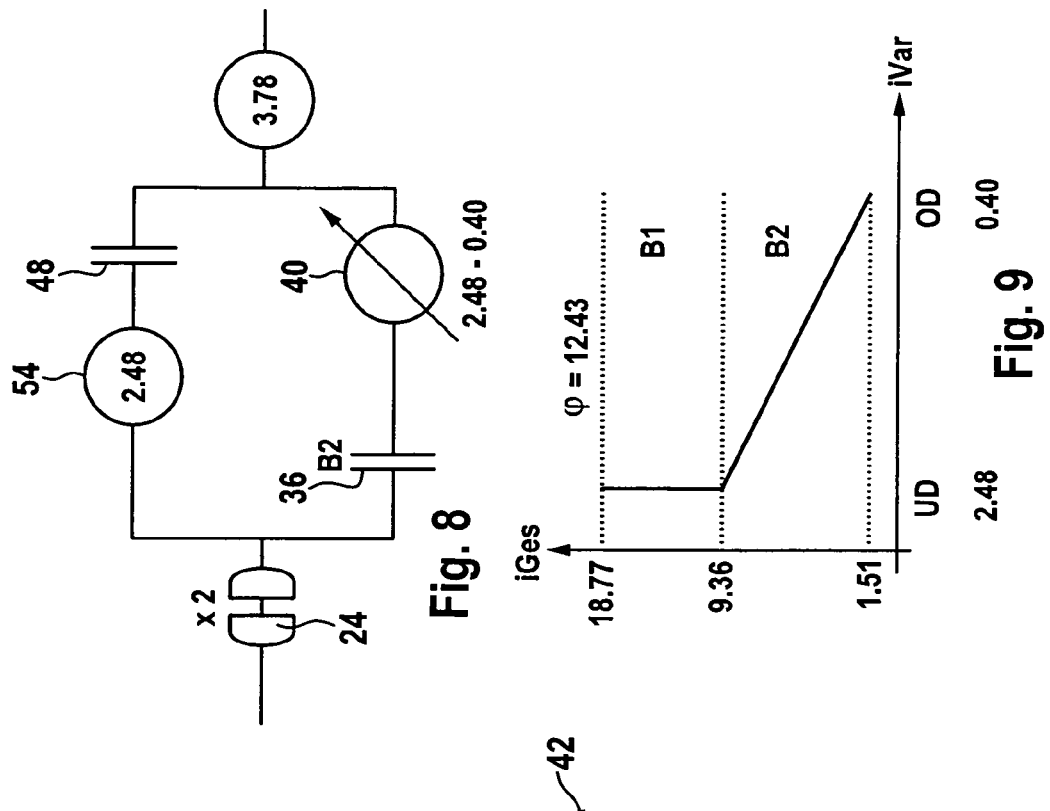
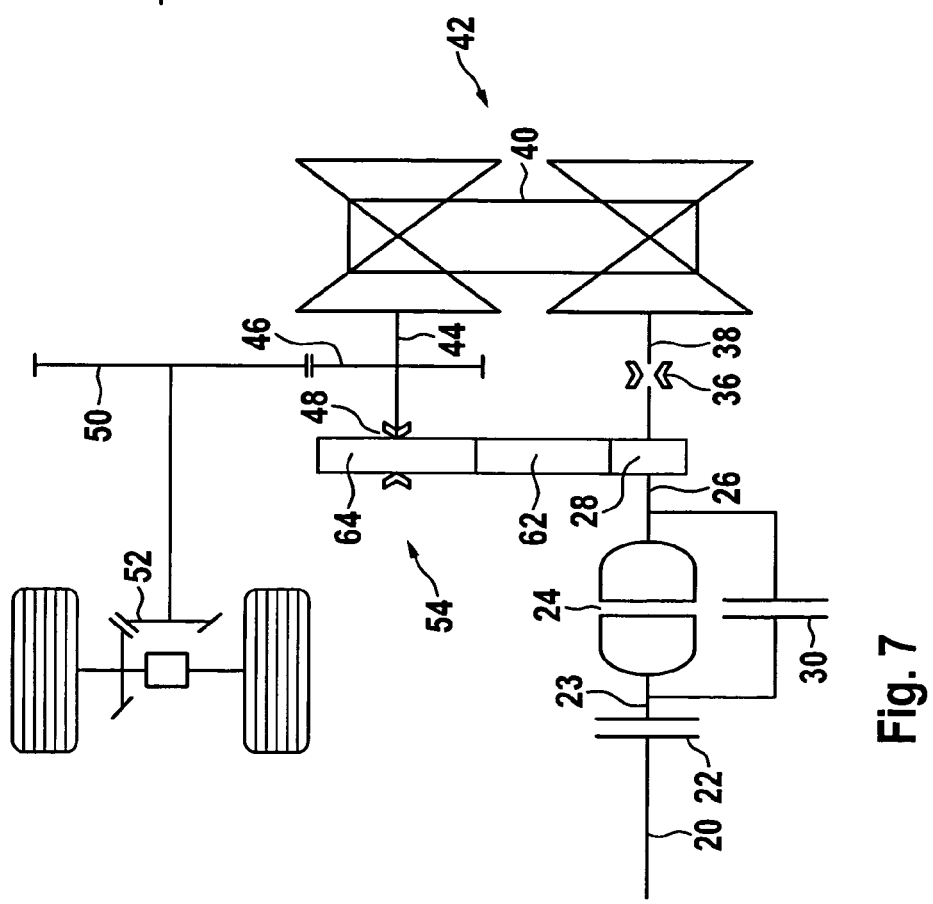

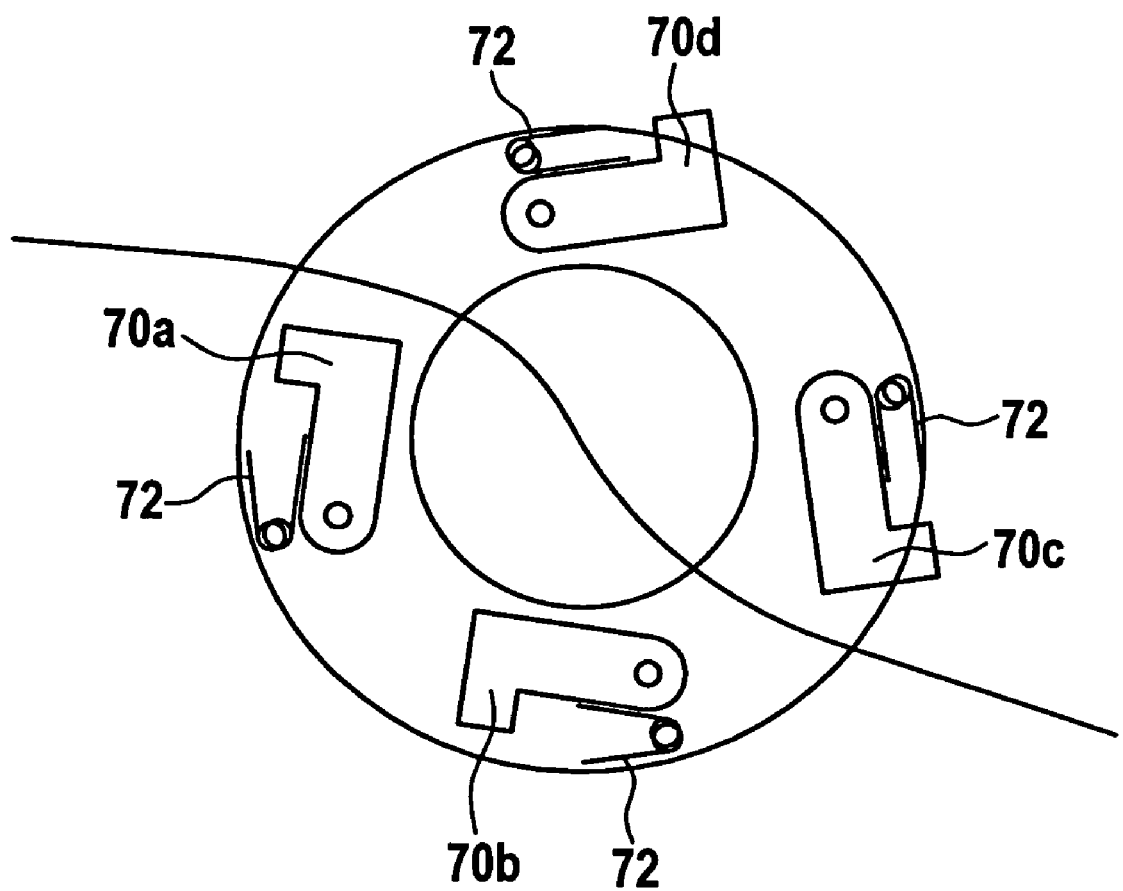

CONTINUOUSLY VARIABLE TRANSMISSION

BACKGROUND OF THE INVENTION

1. Field of the Invention

The present invention relates to a transmission for a motor vehicle, wherein the transmission includes a torque converter and a continuously variable transmission and provides jerk-free shifting.

2. Description of the Related Art

Transmissions having a continuously variable transmission ratio provide the advantage of changing the transmission ratio continuously, entirely without jerking. A characteristic feature of such transmissions is their limited transmission ratio spread and their limited torque transmitting capability. In order to avoid disadvantages because of those characteristic features, power-branched transmission structures are employed that enable a greater transmission ratio spread and that include a continuously variable transmission stage, in particular a variable speed drive unit. The design of such transmission structures is generally relatively complex.

An object of the present invention is to provide a transmission, in particular a motor vehicle transmission, having a continuously variable transmission ratio that enables a large transmission ratio spread and that is capable of accommodating a high torque of a drive engine.

SUMMARY OF THE INVENTION

Briefly stated, in accordance with one aspect of the present invention, a motor vehicle transmission having a continuously variable transmission ratio is provided. The transmission includes an input-side torque converter, which is selectively connectable on the torque converter output side to the output shaft of the transmission through a gear stage having a predetermined gear ratio, or through a continuously variable transmission stage, so that it transmits torque. The transmission ratio of the continuously variable transmission stage is adjustable to a value in such a way that the rotational speed of the transmission output shaft remains constant when the transmission of torque is shifted.

The transmission in accordance with the present invention includes two separate, non-split branches, one branch having a converter as a startup element and another branch having a continuously variable transmission stage. The limitations of the continuously variable transmission stage are not present when starting out, because the torque is not transmitted through the continuously variable transmission stage when starting out.

A transmission in accordance with the present invention includes, for example, an input shaft that is coupleable with an engine-driven shaft, and an intermediate shaft that is coupleable with the input shaft by the torque converter. The intermediate shaft is selectively connectable to the transmission output shaft by the gear stage having a predetermined gear ratio, so that it transmits torque. The intermediate shaft is also selectively connectable to an input shaft of the continuously variable transmission stage so that it transmits torque. A torque transmission shift mechanism having two shift clutches is provided, whereby the transmission of torque through the gear stage can be established and released with one shift clutch, and the transmission of torque through the continuously variable transmission stage can be established and released with the other shift clutch.

Advantageously, the intermediate shaft is non-rotatably connected to a gear that engages a first gear and a second gear, wherein the first gear is non-rotatably coupleable with the transmission output shaft through one shift clutch, and wherein the second gear is non-rotatably coupleable with the input shaft of the continuously variable transmission stage through the other shift clutch.

In another embodiment of the present invention, the intermediate shaft is non-rotatably connected to a gear that is connected via an intermediate gear to a gear that is non-rotatably connected to the transmission output shaft. The transmission of torque via the transmission path containing the intermediate gear is interruptible by the one shift clutch, and the intermediate shaft is non-rotatably coupleable to the input shaft of the continuously variable transmission stage via the other shift clutch.

In a modified embodiment of the transmission in accordance with the present invention, the intermediate shaft is non-rotatably connected to a wheel that is non-rotatably connected via an endless torque-transmitting means to another wheel that is non-rotatably coupleable to the transmission output shaft by means of the one shift clutch, and the intermediate shaft is non-rotatably coupleable to the input shaft of the continuously variable transmission stage via the other shift clutch.

The shift clutches can be formed in a simple manner by jaw or claw clutches.

The continuously variable transmission stage is advantageously a belt-driven conical-pulley transmission.

The torque converter is advantageously bridgeable by means of a lockup clutch.

The transmission output shaft is advantageously non-rotatably connected to a gear that engages another gear that is non-rotatably connected to a shaft that leads to a driven vehicle axle through a differential.

The torque converter can be uncoupled from an engine-driven shaft on the input side by means of a clutch, so that the drag torques of the torque converter drops to zero. In that way fuel can be saved when idling.

The transmission in accordance with the present invention is of relatively simple construction and requires only a few components, such as gears or simple jaw or claw clutches, for example. A converter, a continuously variable transmission stage, for example a chain-driven variable speed drive unit, two shift clutches, for example jaw or claw clutches as coupling/uncoupling elements, and four gears up to the differential of a driven axle suffice to realize the transmission in accordance with the present invention. The reverse gear can be integrated directly into the converter in a known manner. Three gears arranged in a sequence, meshing with each other, can be replaced by a toothed belt or a toothed chain.

The transmission in accordance with the present invention, which is especially well suited as a motor vehicle transmission, can be used in any other application in which a large transmission ratio spread is needed in combination with a high torque transmission capability.

BRIEF DESCRIPTION OF THE DRAWINGS

The structure, operation, and advantages of the present invention will become further apparent upon consideration of the following description, taken in conjunction with the accompanying drawings in which:

FIG. 1 shows the structural arrangement of a first embodiment of a transmission in accordance with the present invention;

FIG. 2 shows in diagrammatic form the layout of the individual transmission elements of the first embodiment;

FIG. 3 is a graph showing the effective gear ratios in each case for the first embodiment;

FIG. 7 shows the structural arrangement of a third embodiment of a transmission in accordance with the present invention;

FIG. 8 shows in diagrammatic form the layout of the individual transmission elements of the third embodiment;

FIG. 9 is a graph showing the effective gear ratios in each case for the third embodiment; and FIG. 10 is a view showing the structural arrangement of a jaw or claw clutch.

DESCRIPTION OF THE PREFERRED EMBODIMENTS

Figure 5:
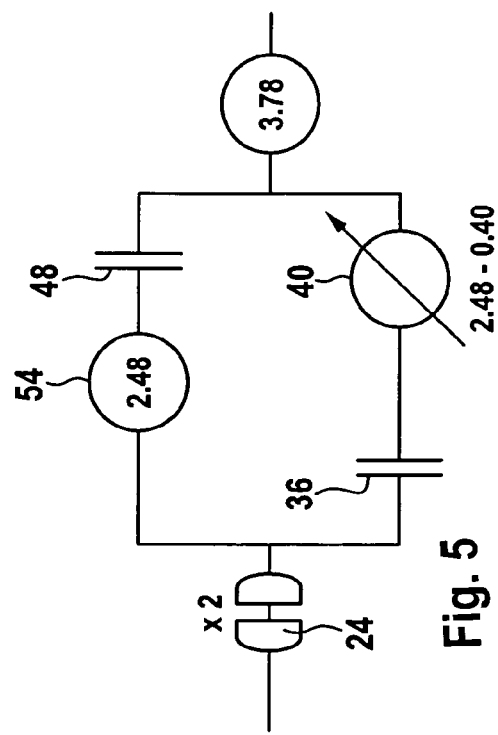
FIG. 5 shows in diagrammatic form the layout of the individual transmission elements of the second embodiment.

In accordance with FIG. 1, a shaft 20 driven by a drive engine (not shown), for example an internal combustion engine, is connectable to and disconnectable from an input or drive shaft 23 of a converter 24, for example a hydrodynamic torque converter, through a clutch 22. The output of converter 24 is non-rotatably connected to an intermediate shaft 26, which in turn, is non-rotatably connected to a gear 28. The converter 24 is bridgeable in a known manner by means of a lockup clutch 30, which is engaged as soon as the difference in rotational speed between the input and the output of the converter drops below a predetermined difference.

Gear 28 meshes with both a first gear 32 and a second gear 34. Second gear 34 is non-rotatably connected through a shift clutch 36 to an input shaft 38 of a variable speed drive unit 40 in the form of a belt-driven conical-pulley transmission 42, which provides a continuously variable transmission stage.

An output shaft 44 of variable speed drive unit 40 is non-rotatably connected to a gear 46, and is non-rotatably connectable to first gear 32 through a shift clutch 48. Output shaft 44, which is simultaneously the output of variable speed drive unit 40, functions as the output shaft of the entire transmission, as will be explained later. Gear 46, which is non-rotatably connected to output shaft 44, meshes with another gear 50, which is non-rotatably connected to a differential 52 of a driven vehicle axle.

The described transmission functions as follows:

To start up (clutch 22 is engaged), lockup clutch 30 is disengaged, shift clutch 36 is disengaged, and shift clutch 48 is engaged. Starting up is thus effected by means of the converter 24, which is connected to output shaft 44 of the transmission through a first transmission stage 54 formed by gears 28 and 32. Belt-driven conical-pulley transmission 42, or its variable speed drive unit 40, is torque-free when starting up. As soon as the process of moving off is ended, lockup clutch 30 is engaged, shift clutch 48 is disengaged, and shift clutch 36 is engaged, so that the transmission of torque now takes place through a second transmission stage 56 and the belt-driven conical-pulley transmission 42, or its variable speed drive unit 40. Alternatively, it is also possible to leave lockup clutch 30 disengaged during the switch-over phase of the shift clutches 40 and 36, in order to damp vibrations and shift jolts.

FIG. 2 shows an example of a design for the individual components shown in FIG. 1. Converter 24 delivers a gear ratio of 2; first transmission stage 54 has a gear ratio of 2.53. Second transmission stage 56 delivers a gear ratio of 1.02. Variable speed drive unit 40 enables continuous adjustment of the gear ratio between 2.48 and 0.4; that is, it has a spread of something over 6.

The final transmission stage, provided by gears 46 and 50, has a gear ratio of 3.7.

FIG. 3 shows the overall transmission ratios of the transmission, with the abscissa indicating the transmission ratio of the variable speed drive unit iVar and the ordinate indicating the respective overall transmission ratio of the transmission iGes.

When starting up, the converter takes hold at a gear ratio of 2; with shift clutch 48 engaged and shift clutch 36 disengaged that is multiplied by the gear ratio 2.53 and the gear ratio 3.7, so that the rotational speed of the internal combustion engine, or of shaft 20, is transmitted up to the input into the differential at an overall gear ratio of 18.77. The variable speed drive unit 40, which does not transmit any torque during the process of moving off, is in the state of a maximum gear ratio of 2.48 (underdrive) while moving off.

When the moving-off process is sufficiently completed so that the converter can be bridged over, i.e., its gear ratio is no longer effective, only the gear ratio 2.53 of first transmission stage 54 is in effect between intermediate shaft 26 and output shaft 44 while shift clutch 48 is still engaged. That gear ratio corresponds to the gear ratio 1.02×2.48 of second transmission stage 56 and of variable speed drive unit 40, which is in the maximum underdrive state, so that in that state shift clutch 48 can be disengaged and shift clutch 36 engaged without producing a change in the rotational speed of output shaft 44. Subsequently, it is possible to fully traverse the spread of the variable speed drive unit, which is 0.40 at maximum overdrive, so that at maximum overdrive the overall gear ratio is a total of 0.4×3.7=1.51.

Referring again to FIG. 3, between overall gear ratios of 18.77 and 9.36 shift clutch 48 is engaged and shift clutch 36 is disengaged. At gear ratio 9.36 shift clutch 48 is disengaged and shift clutch 36 is engaged, so that the gear ratio can then be reduced down to a value of 1.51. The total spread φ of the transmission is 12.43.

Figure 4:
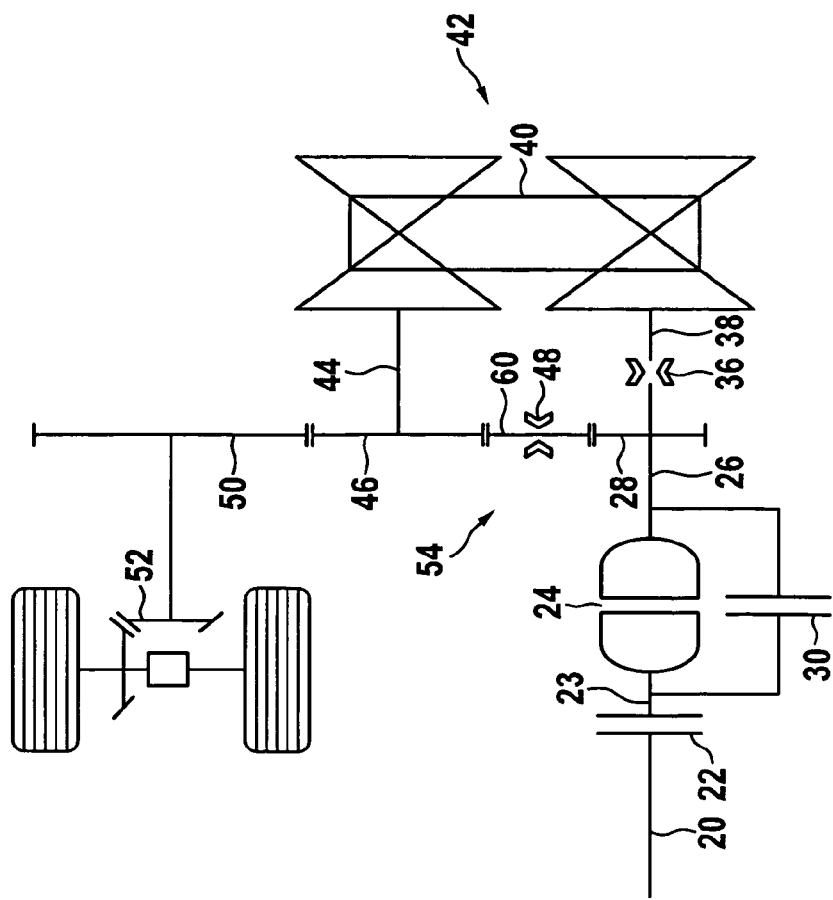
FIG. 4 shows the structural arrangement of a second embodiment of a transmission in accordance with the present invention.

FIG. 4 shows a modified embodiment of the transmission, with the same reference numerals as in FIG. 1 for components with similar functions.

In contrast to the embodiment in accordance with FIG. 1, in the embodiment in accordance with FIG. 4 intermediate shaft 26, which is the output shaft of converter 24, is directly non-rotatably coupleable through shift clutch 36 to input shaft 38 of the variable speed drive unit 40. Gear 28, which is non-rotatably connected to intermediate shaft 26, meshes through an intermediate gear 60 with gear 46, which is non-rotatably connected to output shaft 44 of the transmission, which is simultaneously the output shaft of variable speed drive unit 40. First transmission stage 54 of the transmission in accordance with FIG. 4 includes gears 28 and 60. The transmission of torque via first transmission stage 54 can be interrupted by shift clutch 48, for example by having intermediate gear 60 made up of two adjacent gears, one of which meshes with gear 28 and the other with gear 46, with shift clutch 48 positioned between the two adjacent gears. As an alternative to shift clutch 48, a shifting element can also be provided that disengages intermediate gear 60 in order to interrupt the transmission of torque.

The second transmission stage 56 of FIG. 1 is lacking or has a gear ratio of 1. The connection between intermediate shaft 26 and input shaft 38 can be interrupted by means of shift clutch 36.

Figure 6:
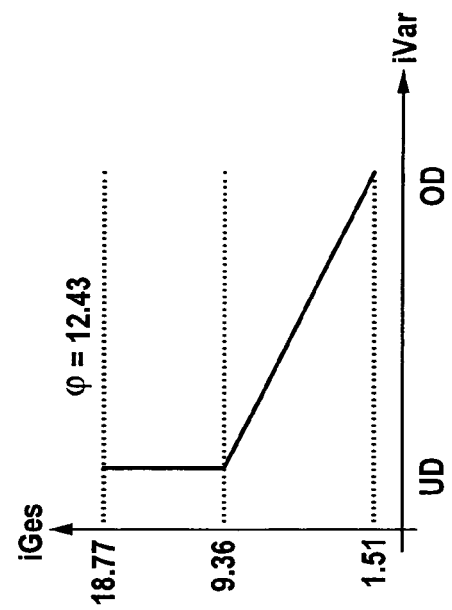
FIG. 6 is a graph showing the effective gear ratios in each case for the second embodiment.

Otherwise the functioning of the transmission in accordance with FIG. 4 corresponds to that of FIG. 1. The individual gear ratios are indicated in FIG. 5. FIG. 6, similar to FIG. 3, shows the overall gear ratio of the transmission iGes as a function of the respective gear ratio iVar of the variable speed drive unit 40.

FIG. 7 shows a third embodiment of a transmission in accordance with the present invention, which differs from the embodiment in accordance with FIG. 4. In the FIG. 7 embodiment gear 28, which is non-rotatably connected to intermediate shaft 26, is connected by way of an endless torque-transmitting means 62, for example a chain or a toothed belt, to another gear 64 so that it transmits torque. Gear 64 is non-rotatably connectable through shift clutch 48 to output shaft 44, which, in turn, is non-rotatably connected to gear 46.

First transmission stage 54, which is designed with a constant gear ratio, is formed by gears 28 and 64 and endless torque-transmitting means 62.

The functioning of the transmission in accordance with FIG. 7 corresponds to that of FIG. 1 or FIG. 4. The gear ratios of the individual elements are indicated in FIG. 8. FIG. 9 shows the overall gear ratio iGes of the gear ratio as a function of the variable speed drive unit transmission ratio iVar.

Shift clutches 36 and 48 can take the form of simple jaw or claw clutches, whose claws 70 shown in FIG. 10 can be swiveled by torsion springs 72 into a retracted position (claws 70a, 70b), and can be moved by hydraulic cylinders, pneumatic cylinders, or electromagnets (not shown), or by some other means, into an extended position (claws 70c, 70d) against the force of the torsion springs 72. The illustrated arrangement is found, for example, in the inner part of a shaft, around which is situated an outer part of the shaft that has recesses in an inner surface that are engaged by the extended claws.

The transmission in accordance with the invention, which has been explained on the basis of three examples, can be modified in a multitude of ways by designing the transmission stages with firmly specified gear ratios in different ways, for example with multiple gears, and by having the shift clutches interrupt or engage the transmission of torque via the respective transmission stage. The continuously variable transmission stage can be designed in a variety of ways, for example as a friction gear transmission, and is not restricted to a belt-driven conical-pulley transmission. The shift clutches can be designed in a great variety of ways Lockup clutch 30 can be omitted, as can clutch 22. The transmission stage designed with a constant gear ratio and an endless torque-transmitting means (transmission stage 54 in FIG. 7) can continue to use frictional engagement.

Because of its wide spread in the direction of overdrive, the transmission in accordance with the present invention makes it possible to significantly reduce the rotational speed of the drive engine, while at the same time a low gear ratio is possible when moving off. The "ideal rotational speed" of the engine, which is necessary for the sake of good engine efficiency while at the same time producing high torque, can be reached very quickly, so that the so-called turbo lag in supercharged engines is less perceptible. The rotational speed necessary for bridging is reached very quickly in the converter, thereby reducing losses. All in all, the transmission contributes to a reduction in fuel consumption while at the same time maintaining good comfort.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A motor vehicle transmission having a continuously variable transmission ratio for transmitting torque, said transmission comprising: a torque converter having an input side and an output side; a first transmission stage having a predetermined gear ratio connected to the output side of the torque converter and connected to a transmission output shaft through a first clutch for providing a first forward speed range; a second, continuously variable transmission stage connected to the output side of the torque converter through a second clutch and to the transmission output shaft for providing a second forward speed range; wherein during starting forward movement of a vehicle containing the transmission the first clutch is engaged and the second clutch is disengaged to provide the first forward speed range while bypassing the continuously variable transmission stage, and the second forward speed range is provided by disengaging the first clutch and engaging the second clutch to transmit torque through the continuously variable transmission stage, wherein the transmission ratio of the continuously variable transmission stage is adjusted to a value such that the rotational speed of the transmission output shaft remains constant when the transmission of torque to the transmission output shaft is shifted between the first transmission forward speed range and the second transmission forward speed range.

2. A transmission in accordance with claim 1, including a transmission input shaft connected with a drive engine; an intermediate shaft that is coupled with the transmission input shaft through the torque converter, which intermediate shaft is selectively connected through one of the first transmission stage to the transmission output shaft so that it transmits torque and to an input shaft of the second, continuously variable transmission stage so that it transmits torque to the transmission output shaft; and a torque transmitting shifting mechanism operatively connected to the first and second clutches, wherein the transmission of torque through the first transmission stage is established and released with the first clutch and the transmission of torque through the second, continuously variable transmission stage is established and released with the second clutch.

3. A transmission in accordance with claim 2, wherein the intermediate shaft is non-rotatably connected to a drive gear that drivingly engages each of a first gear and a second gear, wherein the first gear is drivingly coupled with the transmission output shaft through the first clutch and the second gear is drivingly coupled with the input shaft of the second, continuously variable transmission stage through the second clutch.

4. A transmission in accordance with claim 2, wherein the intermediate shaft is non-rotatably connected to a drive gear that drivingly engages an intermediate gear that is operatively connected to a further gear that is non-rotatably connected to the transmission output shaft, wherein the transmission of torque through a transmission path containing the intermediate gear is releasable by the first clutch, and wherein the intermediate shaft is non-rotatably coupled to the input shaft of the second, continuously variable transmission stage by the second clutch.

5. A transmission in accordance with claim 2, wherein the intermediate shaft is non-rotatably connected to a first wheel that is drivingly connected by an endless torque-transmitting means to a second wheel that is non-rotatably coupled to the output shaft by the first clutch, and the intermediate shaft is non-rotatably coupled to the input shaft the second, continuously variable transmission stage by the second clutch.

6. A transmission in accordance with claim 2, wherein the first and second clutches are claw clutches.

7. A transmission in accordance with claim 1, wherein the continuously variable transmission stage is a belt-driven conical-pulley transmission having a continuously variable transmission ratio.

8. A transmission in accordance with claim 1, wherein the torque converter includes a lockup clutch.

9. A transmission in accordance with claim 1, wherein the transmission output shaft is non-rotatably connected to a drive gear that operatively engages a driven gear that is non-rotatably carried by a driven shaft connected to a differential that carries a vehicle axle.

10. A transmission in accordance with claim 1, including an input side clutch positioned between a drive engine and the torque converter.

* * * * *